United States Patent [19] [11] Patent Number: 4,997,971
Maeda et al. [45] Date of Patent: Mar. 5, 1991

[54] STABILIZED POLY (β-METHYL-δ-VALEROLACTONE)

[75] Inventors: Toshihiko Maeda; Noriaki Yoshimura, both of Kurashiki, Japan

[73] Assignee: Kuraray Co., Ltd., Kurashiki, Japan

[21] Appl. No.: 167,120

[22] Filed: Mar. 11, 1988

[30] Foreign Application Priority Data

Mar. 13, 1987 [JP] Japan .................................. 62-59673
Mar. 13, 1987 [JP] Japan .................................. 62-59674

[51] Int. Cl.$^5$ ............................................. C07C 69/00
[52] U.S. Cl. ........................................................ 560/4
[58] Field of Search ........................................... 560/4

[56] References Cited

U.S. PATENT DOCUMENTS 3,193,522  7/1965  Neumann et al. ...................... 560/4
3,193,523  7/1965  Neumann et al. ...................... 560/4
4,551,518  11/1985  Matsumoto et al. .................. 528/80
4,704,445  11/1987  Komiya et al. ....................... 528/49

FOREIGN PATENT DOCUMENTS 1966169  11/1971  Fed. Rep. of Germany .
2110572  7/1972  Fed. Rep. of Germany .
3426875  1/1985  Fed. Rep. of Germany .

OTHER PUBLICATIONS

*Organic and Biological Chemistry*, Campbell, Tod W. et al., vol. 84, Oct. 5, 1962, pp. 3673–3677.
Patent Abstracts of Japan, vol. 11, No. 246 (C-439) (2693) 11 Aug. 1987; & JP-A-6253321 (Kuraray Co. Ltd.) 09.03.1987; (Cat. A).
Patent Abstracts of Japan, vol. 10, No. 172 (C-354) (2228) 18 Jun. 1986; & JP-A-6123619 (Kuraray K. K.) 01.02.1986.
Patent Abstracts of Japan, vol. 4, No. 159 (C-30) (641) 6 Nov. 1980; & JP-A-55104315 (Daicel K. K.) 09.08.1980.
Patent Abstracts of Japan, vol. 9, No. 188 (C-295) (1911) 3 Aug. 1985; & JP-A-6055026 (Kuraray K. K.) 29.03.1985.
Patent Abstracts of Japan, vol. 10, No. 123 (C-344) (2180) 8 May 1986; & JP-A-60248727 (Kuraray K. K.) 09.12.1985.
Patent Abstracts of Japan, vol. 11, No. 89 (C-411) (2536) 19 Mar. 1987; & JP-A-61241354 (Daicel Chem. Ind. Ltd.) 27.10.1986; (Cat. A).
*Polymerization of δ-Valerolactone and Preparation of a Thermostable Derivative from its Polyester*, by Kazuo Saotome and Yasuto Kodaira—pp. 41–52 from the Technical Research Laboratory, Asahi Chemical Industry Co., Tokyo, Japan, 5/11/64.

*Primary Examiner*—Bruce Gray
*Attorney, Agent, or Firm*—Oblon, Spivak, McClelland, Maier & Neustadt

[57] ABSTRACT

Polyester polyols containing the following recurring unit derived from β-methyl-δ-valerolactone $(OCH_2CH_2CH(CH_3)CH_2CO)$ used to be low in stability. It has been discovered that the stability of the polyester polyols of this type can be improved by reducing the acid value to down 0.25 or lower, and that this can be effected by heat treatment under reduced pressure to remove low-boiling compounds and/or by addition of an organic carbodiimide.

7 Claims, No Drawings

STABILIZED POLY (β-METHYL-δ-VALEROLACTONE)

BACKGROUND OF THE INVENTION

1. Field of the Invention

This invention relates to polymers containing the following recurring unit derived from β-methyl-δ-valerolactone-(OCH₂CH₂CH(CH₃)CH₂CO)-, (hereinafter referred to as PMVL or β-methyl-δ-valerolactone-based polymers in some cases) with improved thermal stability. Polymers containing the above recurring unit are liquid polyesters in which substantially all the terminal groups are hydroxyl groups, and are hence easy to handle and useful as a segment to impart crystalline polymers with amorphous characteristics. In addition, the polyester diols prepared from β-methyl-δ-valerolactone by using a diamine or diol as initiator are useful as soft segment in polyurethanes, giving higher hydrolytic and fungal resistances compared with conventional polyester-based polyurethanes (U.S. Pat. No. 4,704,445).

2. Description of the Prior Art

A method is known in which a polyester glycol containing the recurring unit derived from δ-valerolactone is prepared by ring opening polymerization of δ-valerolactone using a glycol as initiator (Japanese Patent Kokai No. 550,256/1985).

It is also known that polymers prepared by ring opening polymerization of lactones undergo depolymerization from the terminals upon heating This decomposition temperature is highly dependent on the type of lactone, being, for example as high as 250° C. for poly-ε-caprolactone (offering no serious problem in practical use in this case).

However, as described in Japanese Patent Kokai No. 248,727/1985, depolymerization upon heating is likely to occur with polyester glycols containing the recurring unit derived from δ-valerolactone, liberating δ-valerolactone monomer. Therefore the troubles of monomer bleeding and resultant disagreeable odor are encountered when this type of glycol is used as plasticizer for polyvinyl chloride and other resins. Furthermore, when this type of polyester glycol is allowed to react with an isocyanate under molten conditions for the manufacture of a polyurethane, depolymerization takes place to liberate δ-valerolactone monomer, with the result that a polymer with a sufficiently high viscosity cannot be achieved because of the reduction in molecular weight.

In order to make the best use of the characteristic features of polymers containing the recurring unit derived from β-methyl-δ-valerolactone, such as high resistance to hydrolysis, their thermal resistance must be enhanced to minimize the monomer liberation, as otherwise their uses will remain very limited.

One excellent feature of polymers containing the recurring unit derived from β-methyl-δ-valerolactone is the high resistance to hydrolysis. However, this characteristic is degraded when the acid value of these polymers is high. In addition, a high acid value also results in lowered storage stability of these polymers (PMVL) and fails to give, when used as a material for the manufacture of polyurethanes, polymers of high polymerization degree.

Strict control of polymerization reaction and after-treatment can be a means for producing PMVL of low acid value. However, our studies have revealed that polymers of high acid value are often obtained even under such a strict control.

Japanese Patent Kokai No. 55,026 /1985 discloses a process for producing a polyester glycol by ring opening polymerization of β-methyl-δ-valerolactone using a glycol as initiator, and a method of purifying the polyester glycol thus obtained. This purification method is "a process which comprises dissolving the polyester glycol obtained in chloroform, washing the chloroform solution with distilled water several times, and heating the washed solution in a rotary evaporator under reduced pressure to remove chloroform, water, monomer and other by-products". This method is effective in lowering the acid value of polyester glycol, but down to about 0.27 at the lowest. Our studies on this method have also revealed that a polyester glycol of higher acid value is likely to result from slight changes in the washing conditions or when the operation is performed on a larger scale.

Another method has been disclosed for purifying δ-valerolactone-based polyester polyols (Japanese Patent Kokai No. 248,727/1985). This is "a process which comprises dissolving the polymer obtained in an organic solvent substantially immiscible with water (e.g., toluene), bringing the solution into contact with an alkaline aqueous solution, and removing the organic solvent from the treated solution". This method is intended for the removal of remaining monomer, but treatment with an alkaline solution could also lead to a reduction in acid value. Actually, however, the acid value of treated polyester polyol is about 0.4 at the lowest.

Polyester polyols with such high acid values as mentioned above have lower utility value, but no method is known to solve this problem associated with the polymers containing the recurring unit derived from β-methyl-δ-valerolactone.

SUMMARY OF THE INVENTION

An object of this invention is to provide polymers containing the recurring unit derived from β-methyl-δ-valerolactone with improved thermal stability.

A further object of this invention is to provide polyester polyols containing the recurring unit derived from β-methyl-δ-valerolactone which have a low acid value and are useful as soft segment in polyurethanes and other polymers.

The other objects and advantages of this invention will become apparent from the following descriptions.

Theses objects of this invention can be achieved by a polyester polyol which (A) contains at least 50 mol % of the recurring unit represented by the following formula (I);

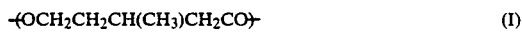

-(OCH₂CH₂CH(CH₃)CH₂CO)-   (I)

(B) has a number average molecular weight of at least 280; (C) carries hydroxyl groups at its terminals; and (D) has an acid value (mg KOH required to neutralize 1 g of polyester) of 0.25 or lower. Such a polyester polyol as defined above can be obtained by removal of low-boiling compounds involved by heating under reduced pressure and/or by addition of an organic carbodiimide, as detailed below.

DETAILED DESCRIPTION OF THE PREFERRED EMBODIMENTS

β-Methyl-δ-valerolactone-based polymers of this invention can be prepared by the known method for producing lactone polymers: ring opening polymerization of β-methyl-δ-valerolactone, or a mixture thereof with other types of monomers, in the presence of a catalyst using an organic compound having active hydrogen as initiator.

As the catalyst, may be used known compounds, such as metallic lithium, metallic sodium, n-butyl lithium, sulfuric acid, phosphoric acid and boron trifluoride etherate, $BF_3(C_2H_5OC_2H_5)$, in an amount of 0.01 to 10 mol. % of the initiator.

Organic compounds having at least one active hydrogen in the form of amino or hydroxyl group are preferably used as the initiator. These may be either low-molecular compounds or high-molecular compounds. Illustrative examples include monohydric alcohols of 1 to 18 carbon atoms, such as methanol, ethanol, butanol, 2-ethylhexanol, 2,7-octadienol, lauryl alcohol, cyclohexanol and benzyl alcohol; polyhydric alcohols of 2 to 22 carbon atoms, such as ethylene glycol, 1,2-propanediol, 2-methyl-1,3-propanediol, 1,4-butanediol, 1,6-hexanediol, 2-methyl-1,8-octanediol, 1,9-nonanediol, 1,10-decanediol, 3-methyl-1,5-pentanediol, neopentyl glycol, naphthalenediols, diethylene glycol, tetraethylene glycol, glycerol, trimethylolpropane and triethanolamine; polyoxyalkylene glycols composed of alkylene chains of 2 to 12 carbon atoms or cycloalkylene chains of 4 to 10 carbon atoms, such as polyoxyethylene glycols and polyoxypropylene glycols having an average molecular weight in the range from 200 to 2000; monoamines of 1 to 18 carbon atoms, such as butylamine, 2-ethylhexylamine, laurylamine, diethylamine, dibutylamine and morpholine; and polyamines of 2 to 12 carbon atoms, such as ethylenediamine, 1,4-butanediamine, 1,6-hexanediamine, p-phenylenediamine and piperazine.

The homopolymer of β-methyl-δ-valerolactone prepared by using a glycol as initiator may be represented by the following formula (II),

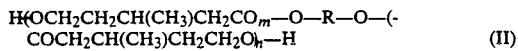

$$H\{OCH_2CH_2CH(CH_3)CH_2CO\}_m\text{—}O\text{—}R\text{—}O\text{—}(\text{-}COCH_2CH(CH_3)CH_2CH_2O)_n\text{—}H \quad (II)$$

(wherein n and m are each 0 or an integer of 1 or larger, and are not 0 at the same time; and R is a bivalent radical).

Polymers that can be used in the process of this invention may either be homopolymers of β-methyl-δ-valerolactone or copolymers thereof containing less than 50 mol % of other copolymerizable monomers, such as δ-valerolactone, ε-caprolactone, formaldehyde and ethylene oxide.

There is no specific limitation upon the average molecular weight of the polymers, but the preferable level is 280 or higher, most preferably in the range from 300 to 20,000.

Polymers just prepared by polymerization still contain a catalyst, which should preferably be removed by washing with water or other suitable methods in order to avoid its adverse effects upon storage stability and hydrolytic resistance of the polymers.

The polymers containing the recurring unit derived from β-methyl-δ-valerolactone thus obtained by the conventional method have a high acid value usually ranging from 0.27 to 5.0.

In the process of this invention, polymers having such a high acid value are heat-treated at a temperature in the range from 120° to 200° C., preferably from 130° to 180° C., under reduced pressure for removal of low-boiling compounds liberated, thereby giving polymers containing the recurring unit derived from β-methyl-δ-valerolactone which have a reduced amount of free carboxyl groups, that is, PMVL with a sufficiently low acid value not attainable by the conventional method. When the heat-treating temperature is lower than 120° C., no reduction in acid value can be expected, while a heat-treating temperature higher than 200° C. must be avoided because of the possible effect upon the thermal stability of the polymer.

The above-mentioned heat treatment results in a drop in acid value, with the simultaneous formation of β-methyl-δ-valerolactone; that is, carboxyl-containing compounds are all removed in the form of low-boiling β-methyl-δ-valerolactone free of carboxyl group. This compound, if left in the polymer, causes many troubles, such as disagreeable odor and monomer bleeding, and should be distilled off as much as possible. This can be effected by maintaining the polymer under a reduced pressure of 0.01 to 20 Torr, preferably 1 to 5 Torr, during the heat treatment.

Since PMVL of this invention is not highly resistant to high temperatures, the above-mentioned heat treatment should preferably be carried out in an apparatus of short residence time. The preferred residence time for one pass may vary with the treating temperature, but usually should be within 15 minutes. Illustrative examples of heat-treating apparatuses suitably used to this end include known falling-film evaporators, centrifugal evaporators and rotary thin-film evaporators. The wiper type thin-film evaporator used in the Examples described later also provides a preferable example.

Reduction in the carboxyl content of polymers can be easily determined by measurement of acid value, and heat treatment may be repeated until the acid value falls to a desired level. It is preferable that the polymer be cooled to a temperature lower than 100° C. after each heat treatment to avoid possible deterioration by thermal decomposition.

The method mentioned above effectively diminishes the carboxyl-containing compounds involved without lowering the molecular weight of PMVL. In addition, the decrease in the amount of carboxyl-containing compounds is accompanied by the recovery of β-methyl-δ-valerolactone monomer (starting material for polymerization).

We have also discovered an unexpected fact that addition to PMVL a small amount (usually 0.01 to 5 weight %) of an organic carbodiimide markedly improves its thermal stability. Little effect to improve thermal stability is observed when the amount added is less than 0.01 weight %. On the other hand, the carbodiimide used in an amount exceeding 5 weight % shows practically the same effect as when the amount is 5 weight % or less, and acts as a plasticizer thus causing changes in the properties of PMVL. The most preferred amount to be added is in the range from 0.05 to 1.0 weight %.

Basically, the polymers used in this invention are polyesters. Various types of additives have been developed for improving thermal stability of polyesters in general, and organic phosphorus compounds, epoxy compounds, amines and phenols are usually employed. However, our studies have revealed that these compounds are ineffective in improving the thermal stability of polyester polyols derived from β-methyl-δ-valerolactone, or even lower the thermal stability in some cases.

We also demonstrated that the addition of a carbodiimide is particularly effective for the polymers with a very low acid value (0.25 or less) first attained by the process of this invention.

The organic carbodiimdes suitably used in this invention are the compounds represented by the following formula (III),

(wherein $R_1$ and $R_2$ are same or different hydrocarbyl radical of 1 to 18 carbon atoms; A and B are each H, —$NHCONR_3R_4$ or —$NHCOOR_5$; $R_3$ and $R_4$ are each H or a hydrocarbyl radical of 1 to 18 carbon atoms; $R_5$ is a hydrocarbyl radical of 1 to 18 carbon atoms; and n is an integer of 1 or larger, preferably an integer from 1 to 10).

These organic carbodiimide compounds may be readily prepared by the known method which comprises reaction of a phosphoryl compound as catalyst upon an organic isocyanate [T. W. Campbell, et al., J. Amer. Chem. Soc., 84, 3673 (1962)].

Illustrative examples of these carbodiimides include dicyclohexyl carbodiimide, diphenyl carbodiimide, di-p-tolyl carbodiimide, di-p-nitrophenyl carbodiimide, di-2-methyl-4-nitrophenyl carbodiimide, bis-2,6-diisopropyl-4-hydroxyphenyl carbodiimide, bis-2,6-diisopropylcyclohexyl carbodiimide, and carbodiimide polymers with an average molecular weight of 1000 to 5000 containing the following structure

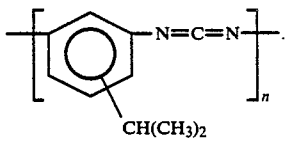

Of these, dicycloalkyl carbodiimides such as dicyclohexyl carbodiimide are best suited for improving the thermal stability of PMVL.

It is most preferred that the organic carbodiimide be added to PMVL after the monomer has been removed. However, when water is used to remove the catalyst after polymerization, it may be added at any time after the water has been completely distilled off (even before or during distilling off of the unreacted β-methyl-δ-valerolactone).

The PMVL to which an organic carbodiimide has been added should be thoroughly stirred to ensure uniform distribution of the additive. At least part of the carbodiimide added is present in the polymer in the reacted form (as a urea compound).

PMVL of this invention may also contain, other than an organic carbodimide, known additives such as a UV absorber and antioxidant.

PMVL of this invention has hydroxyl groups at its terminals and shows improved thermal stability, and hence can be used as a plasticizer for plyvinyl chloride and other resins and as a material for the production of polyurethanes by melt polymerization. In addition, its high hydrolytic resistance and other excellent properties make it usable in many other fields.

The following examples will further illustrate the invention but are not intended to limit its scope.

In these examples, the acid value was determined by exactly weighing 1 to 3 g of sample, dissolving it in 20 ml acetone, and titrating the solution with 0.1N methanolic KOH solution using phenolphthalein as indicator, followed by calculation according to the following equation:

Acid value (mg KOH/g-sample) =

$$\frac{0.1N \text{ KOH consumption (ml)} \times 0.1 \times 56.11}{\text{Sample (g)}}$$

EXPERIMENTAL EXAMPLE 1

In a 2-liter three-necked flask fitted with a thermometer, a dropping funnel and a stirrer, were placed 16 g anhydrous ethylene glycol and 610 g anhydrous βmethyl-δ-valerolactone, and 1.0 ml of a hexane solution containing n-BuLi (1.5 mol/l) was added dropwise with stirring under a nitrogen atmosphere. After the exothermic reaction ceased, the mixture was held at 60° C. for two hours, the polymer solution thus obtained was dissolved in 600 ml toluene, 200 ml distilled water was added, and 4N NaOH solution was then added with stirring until the pH reached 12 (about 250 ml). The resulting mixture was transferred to a separating funnel, the aqueous layer was discarded, and the toluene layer was washed twice with 300 ml distilled water and heated in an evaporator at a bath temperature of 60° C. to distill off most of the toluene. The residue in the flask was transferred to a vacuum-distillation apparatus, where it was heated at a bath temperature of 100° C. under a reduced pressure of 1 mmHg for one hour to remove the remaining toluene, giving 480 g of toluene-free polymer. Analysis of this polymer by high-performance liquid chromatograpy detected no monomer The polymer thus obtained (a β-methyl-δ-valerolactone-based polyester diol) had an average molecular weight of 2020 and an acid value of 0.48.

This polymer (400 g) was heat-treated in a wiper type thin-film evaporator (6.0 mmφ×200 mmH) at 150° C., under a reduced pressure of 4 Torr and at a feed rate of 200 g/hr, with the receiver being externally cooled with water. Analysis of the treated polymer showed an acid value of 0.19 and an average molecular weight of 2040. The low-boiling product collected, which was a neutral liquid, proved to be 100% β-methyl-δ-valerolactone.

EXPERIMENTAL EXAMPLE 2

The two kinds of β-methyl-δ-valerolactone-based polyester diols prepared in Experimental Example 1 (acid value: 0.48 and 0.19) were each heated in a sealed tube at 110° C. for four hours. After cooling, the treated sample was analyzed by high-performance liquid chromatography for the increase in the amount of β-methyl-δ-valerolactone monomer and its viscosity at 40° C. was measured by using a Type-E viscometer. With the polyester diol having an acid value of 0.48, the amount of monomer increased by 5.8 weight % after the heat treatment and the viscosity change reached 61%, while these values were 0.7 weight % and 19.3%, respectively, with the polyester diol having an acid value of 0.19. This indicates that thermal stability lowers markedly with increasing acid value.

EXPERIMENTAL EXAMPLES 3 THROUGH 8

The β-methyl-δ-valerolactone-based polyester diol having an average molecular weight of 2020 and an acid value of 0.48, prepared in Experimental Example 1, was heat-treated in the same apparatus as used above under varying conditions as shown in Table 1 (test sample: 100 g each). The properties of the treated polyester diols are summarized in the same table.

TABLE 1

| | Treating Conditions | | | After Treatment | |
|---|---|---|---|---|---|
| | Temp. (°C.) | Degree of Vaccum (Torr) | Feed Rate (g/hr) | Acid Value | Av. M.W. |
| Exper. Ex. 3 | 160 | 5 | 200 | 0.15 | 2040 |
| Exper. Ex. 4 | 140 | 2 | 200 | 0.15 | 2030 |
| Exper. Ex. 5 | 120 | 2 | 100 | 0.20 | 2040 |
| Exper. Ex. 6 | 190 | 5 | 300 | 0.12 | 2000 |
| Exper. Ex. 7 | 100 | 2 | 100 | 0.35 | 2030 |
| Exper. Ex. 8 | 220 | 5 | 300 | 0.12 | 1900 |

As can be seen from the table, heat treatment under the conditions specified in this invention gave polymers of low acid values with no marked drop in molecular weight. On the contrary, a low heat-treating temperature resulted in insufficiently improved acid value (Experimental Example 7), while an excessively high heat-treating temperature led to a marked drop in moleculare weight although the acid value was sufficiently low (Experimental Example 8).

EXPERIMENTAL EXAMPLE 9

A β-methyl-δ-valerolactone-based polyester diol having a number average molecular weight of 2000 and an acid value of 0.52 was prepared by ring opening polymerization of a mixture of β-methyl-δ-valerolactone with 20 mol % of ε-caprolactone in the same manner as in Experimental Example 1 using ethylene glycol as initiator. This polyester diol (200 g) was heat-treated twice in the same apparatus as used above at 150° C., under a reduced pressure of 5 Torr and at a feed rate of 200 g/hr, giving a product having an acid value of 0.12 and average molecular weight of 2020.

EXPERIMENTAL EXAMPLE 10

A β-methyl-δ-valerolactone-based polyester diol having a number average molecular weight of 5000 and an acid value of 0.44 was prepared by ring opening polymerization of β-methyl-δ-valerolactone in the same manner as in Experimental Example 1 using piperazine as initiator. This polyester diol (100 g) was heat-treated in the same apparatus as used above at 140° C., under a reduced pressure of 2 Torr and at a feed rate of 100 g/hr, giving a product having an acid value of 0.20 and average molecular weight of 5000.

As is apparent from the above, the method of this invention is capable of purifying a β-methyl-δ-valerolactone-based polyester polyol with a high acid value into a product of a low acid value by simple operations, and is therefore of great industrial use. Furthermore, it was difficult for the conventional methods to achieve an acid value of 0.27 or lower even under strict control of polymerization and after-treatment conditions, but βmethyl-δ-valerolactone-based polyester polyols with a very lower acid value (e.g., 0.25 or lower) can be easily produced by the process of this invention.

EXPERIMENTAL EXAMPLE 11

In a 1-liter three-necked flask fitted with a thermometer, a dropping funnel and a stirrer, were placed 15 g anhydrous ethylene glycol and 571 g anhydrous β-methyl-δ-valerolactone, and 1.0 ml of a hexane solution containing n-BuLi (1.5 mol/l) was added dropwise with stirring under a nitrogen atmosphere. The mixture was held at 60° C. for two hours, the polymer solution thus obtained was dissolved in 600 ml toluene, and the diluted solution was washed twice with 300 ml water. The resulting solution was heated in a rotary evaporator to distill off the toluene, and the polymer solution containing unreacted monomer was treated in a wiper type thin-film evaporator at 140° C. under a reduced pressure of 3 Torr to remove the monomer. The β-methyl-δ-valerolactone-based polyester diol thus obtained had an average molecular weight of 2040 and an acid value of 0.15, and contained 0.2 weight % of β-methyl-δ-valerolactone and 0.02 weight % of moisture. Its viscosity measured with a Type-E viscometer was 20.6 poise at 40° C.

EXPERIMENTAL EXAMPLE 12

The β-methyl-δ-valerolactone-based polyester diol obtained in Experimental Example 11 (30 g) was placed in a sealed tube and heated at 200° C. for one hour. Analysis of the treated polymer by high-performance liquid chromatography and gel permeation chromatography showed that the amount of β-methyl-δ-valerolactone monomer contained was 54 weight % and the molecular weight was 950. It was also demonstrated from NMR spectral analysis that the treated polymer is a polyester diol in which all the terminal groups are hydroxyl groups.

The same polymer sample as above was heated in a sealed tube at 110° C. for four hours and the viscosity of the treated polymer was measured at 40° C. The rate of change in viscosity is shown in Table 2.

EXPERIMENTAL EXAMPLE 13

In the β-methyl-δ-valerolactone-based polyester diol obtained in Experimental Example 11 (50 g), was homogeneously dissolved 0.05 weight % of dicyclohexyl carbodiimide. The resulting polymer (30 g) was heat-treated at 200° C. for one hour in the same manner as in Experimental Example 12. Analysis of the treated polymer by high-performance liquid chromatography and gel permeation chromatography showed that the amount of β-methyl-δ-valerolactone monomer contained was 3.0 weight % and the molecular weight was 2010. It was also demonstrated from NMR spectral analysis that the treated polymer is a polyester diol in which all the terminal groups are hydroxyl groups.

EXPERIMENTAL EXAMPLES 14 THROUGH 25

To the β-methyl-δ-valerolactone-based polyester diol obtained in Experimental Example 11 (20 g), was added each of the organic carbodiimides listed in Table 2 in the predetermined amount, and the resulting polymer was heated in a sealed tube at 110° C. for four hours. After cooling, the treated polymer was taken out and its viscosity at 40° C. was measured by means of a Type-E viscometer. The rate of change in viscosity caused by heat treatment is also shown in Table 2.

EXPERIMENTAL EXAMPLE 26

In a 1-liter three-necked flask fitted with a thermometer, a dropping funnel and a stirrer were placed 14.75 g anhydrous 3-methylpentane-1,5-diol, 28 g ε-caprolactone and 253 g anhydrous β-methyl-δ-valerolactone, and 0.5 ml of a hexane solution containing n-BuLi (1.5 mol/l) was added dropwise with stirring under a nitrogen atmosphere. The mixture was held at 60° C. for two hours, the polymer solution thus obtained was dissolved in 500 ml toluene, and the diluted solution was washed twice with 200 ml water at room temperature. The resulting solution was heated in a rotary evaporator to distill off most of the toluene, 0.2 weight % of dicyclohexyl carbodiimide was added to the polymer solution containing unreacted monomer and undistilled toluene, and the resulting mixture was treated in a wiper type thin-film evaporator at 150° C. under a reduced pressure of 5 Torr to remove the monomer and toluene.

The polymer thus obtained was a polyester diol having an average molecular weight of 2000 and an acid value of 0.05 and containing 0.15 weight % of β-methyl-δ-valerolactone. It was heat-treated in a sealed tube at 200° C. for

TABLE 2

| Example No. | Additive Type | Amt. (wt %) | Rate of change in viscosity after heat treatment (%)[1] |
|---|---|---|---|
| 12 | None | — | 19 |
| 14 | Dicyclohexyl carbodiimide | 0.05 | 0 |
| 15 | Dicyclohexyl carbodiimide | 0.1 | 0 |
| 16 | Dicyclohexyl carbodiimide | 0.3 | 0 |
| 17 | Stabaksol PCD (Bayer)[2] | 4.0 | 0 |
| 18 | Tris(2,4-di-t-butylphenyl) phosphite | 0.15 | 20 |
| 19 | N,N-Diphenylthiourea | 0.15 | 22 |
| 20 | n-Dodecylmercfaptane | 0.15 | 23 |
| 21 | 1,2-Cyclohexane oxide | 0.15 | 18 |
| 22 | Di-p-naphthyl-p-phenylenediamine | 0.15 | 19 |
| 23 | Triethylamine | 0.15 | 19 |
| 24 | Ethylene carbonate | 0.15 | 20 |
| 25 | $H_2N(CH_2)_3Si(OC_2H_5)_3$ | 0.15 | 15 |

[1]Rate of change in viscosity = (Viscosity before treatment)/(Viscosity after treatment) × 100

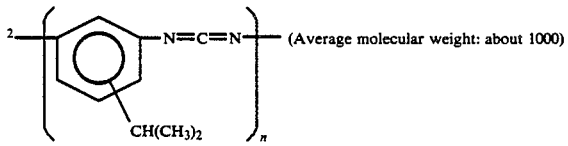

[2] (Average molecular weight: about 1000)

one hour in the same manner as in Experimental Example 13, giving a polyester diol having an average molecular weight of 1990, containing 2.1 weight % of β-methyl-δ-valerolactone and having an acid value of 0.05.

EXPERIMENTAL EXAMPLE 27

A copolymer was prepared in much the same manner as in Experimental Example 26 except that dicyclohexyl carbo-diimide was not added. Its molecular weight was 1985 the content of β-methyl-δ-valerolactone was 0.2 weight % and the acid value was 0.12.

This polymer (20 g was heat-treated in a sealed tube at 200° C. for one hour in the same manner as in Experimental Example 13, giving a polyester diol having an average molecular weight of 1100, containing 45 weight % of β-methyl-δ-valerolactone and having an acid value of 0.12.

EXPERIMENTAL EXAMPLE 28

Polyurethanes were derived from the β-methyl-δ-valerolactone-based polyester diol (PMVL) having an average molecular weight of 2040, obtained in Experimental Example 11, from PMVL with 0.4 weight % dicyclohexyl carbodiimide added thereto and from a polycaprolactone (average molecular weight: 2300, acid value: 0.21) each, and their resistance to hydrolysis was compared. These polyurethanes were synthesized by reaction of a polyester diol, 1,4-butanediol and 4,4'-diphenylmethane diisocyanate (at a 1:2:3 molar ratio) at 70° C. in dimethylformamide. The concentration of resulting polyurethane was 25 weight %. Each of the polyurethane solutions was coated to give dry film 100μ thick, the film was left immersed in water at 100° C. for 12 days, and the change in viscosity of its DMF solution was measured. The test showed that the viscosity retention of the polyurethane derived from PMVL, PMVL with dicyclohexyl carbodiimide added thereto and polycaprolactone was 89%, 89% and 20%, respectively. This indicates higher hydrolytic resistance of PMVL (both in the presence and absence of carbodiimide) compared with polycaprolactone.

It is also apparent from the above that addition of an organic carbodiimide to a polymer containing the recurring unit derived from β-methyl-δ-valerolactone suppresses the liberation of β-methyl-δ-valerolactone monomer and markedly enhances the thermal stability of the polymer.

What is claimed is:

1. A stabilized polyester comprising (A) a polyester containing at least 50 mol % of the recurring unit represented by the following formula (I),

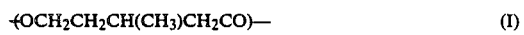

having a number average molecular weight of at least 280, an acid value of 0.20 or lower before an organic carbodiimide is added, and carrying hydroxyl groups at its terminals, and (B) 0.01 to 5 weight % of an organic carbodiimide added thereto.

2. The polyester as defined in claim 1 wherein the acid value of said polyester before the organic carbodiimide is added is 0.15 or lower.

3. The polyester as defined in claim 1 wherein said organic carbodiimide is a compound represented by the following formula (III),

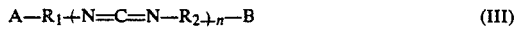

(wherein $R_1$ and $R_2$ are same or different hydrocarbyl radical of 1 to 18 carbon atoms; A and B are each H, $NHCONR_3R_4$ or $-NHCOOR_5$; $R_3$ and $R_4$ are each H or a hydrocarbyl radical of 1 to 18 carbon atoms; $R_5$ is a hydrocarbyl radical of 1 to 18 carbon atoms; and n is an integer of 1 or larger, preferably an integer from 1 to 10).

4. The polyester as defined in claim 3 wherein said organic carbodiimide is dicyclohexyl carbodiimide.

5. The polyester as defined in claim 1 wherein said organic carbodiimide is added in an amount in the range from 0.05 to 1.0 weight %.

6. The polyester as defined in claim 1 wherein the acid value of said stabilized polyester is 0.1 or lower.

7. The polyester as defined in claim 1 wherein said organic carbodiimide can be detected as a urea derivative in the polymer.

* * * * *